United States Patent [19]

Eisele

[11] Patent Number: 5,159,182
[45] Date of Patent: Oct. 27, 1992

[54] SMART DATA STORAGE DEVICE

[75] Inventor: Raymund H. Eisele, Idstein, Fed. Rep. of Germany

[73] Assignee: SmartDiskette GmbH, Idstein/TS, Fed. Rep. of Germany

[21] Appl. No.: 448,093

[22] Filed: Dec. 12, 1989

[30] Foreign Application Priority Data

Dec. 12, 1988 [DE] Fed. Rep. of Germany ....... 3841776
Feb. 6, 1989 [DE] Fed. Rep. of Germany ....... 3903454

[51] Int. Cl.$^5$ ...................... G06K 19/07; G06K 19/08
[52] U.S. Cl. .................................. 235/492; 235/493; 360/137
[58] Field of Search ............... 235/492, 493, 449, 487; 360/137, 132, 133

[56] References Cited

U.S. PATENT DOCUMENTS

| 3,946,156 | 3/1976 | Budrose | 360/137 |
| 4,034,164 | 7/1977 | Westmoland | 360/137 |
| 4,504,871 | 3/1985 | Berwick et al. | 360/137 |
| 4,575,621 | 3/1986 | Dreifus | 235/492 |
| 4,701,601 | 10/1987 | Francini et al. | 235/493 |
| 4,791,283 | 12/1988 | Burkhardt | 235/493 |

FOREIGN PATENT DOCUMENTS 3528199 2/1987 Fed. Rep. of Germany .

OTHER PUBLICATIONS

IBM Technical Disclosure Bulletin, vol. 30, No. 3, Aug. 1987, "Personal Transaction Card", pp. 1262-1265.
IBM Technical Disclosure Bulletin, vol. 28, No. 6, Nov. 1985, "Transaction Handling System Using a Bank Card with Display, Input and Memory Functions", pp. 2568-2570.

Primary Examiner—Robert Weinhardt
Attorney, Agent, or Firm—Spencer, Frank & Schneider

[57] ABSTRACT

An insertable device, for use with electronic data processing equipment data transfer units, e.g., disk drives or cassette units. The device includes a housing for insertion into the electronic data processing equipment data transfer unit designed to fit the data transfer unit, an interface disposed in the housing for facilitating the transfer of data between the device and the electronic data processing equipment, and a processor disposed in the housing and operatively connected to the interface, for performing processing of data.

13 Claims, 4 Drawing Sheets

SMART DATA STORAGE DEVICE

BACKGROUND INFORMATION

1. Field of the Invention

The invention is applicable to a magnetic-strip card, a diskette, a cassette or similar, and is basically an element fitted with an interface which can be inserted into Electronic Data Processing (EDP) equipment such as a magnetic read/write unit, diskette-drive, cassette-drive etc.

2. Background Information

In general, magnetic-strip cards are used in systems such as cash-dispensers, door-openers, automatic-timing systems etc. A disadvantage is that the magnetic-strips currently in use can quite simply be read by non-authorized users or even copied and/or altered. For this reason access to the above mentioned types of EDP-equipment by non-authorized users cannot always be prevented with certainty at present.

Cards the size of a magnetic-strip card with a built-in processor can already be produced (Smart card). However, these type of cards can only be used in EDP systems equipped with special interfaces (with or without contacts) through which data can be exchanged between the card's processor and the EDP-equipment.

Typical EDP systems making use of diskettes, cassettes or similar data storage devices are computers, and personal computers (PCs) in particular. These are equipped with diskette or cassete drives according to which type of system is being used, with a read/write unit or head. This enables the data and programs stored on the data storage device to be read and transferred to the computer and additionally, to write programs and store data on the data storage devices. In this way one can store data and programs which are required in the computer on external storage devices. The disadvantage of the usual diskettes or cassettes is that they can easily be copied. For example, programs under copyright can be reproduced without paying license fees or restricted information can be copied and passed on to non-authorized persons.

At the same time it is impossible to be certain whether programs stored in a data storage device are in fact the original or whether they may have been tampered with by so-called computer-viruses or may contain a "trojan horse". To verify user-identities and/or to encrypt/decrypt data, plug-in boards for the databus or microchannel of the computer are generally in use. However, these type of cards are expensive to produce and install and require hardware and software which has to be re-developed for each different type of computer system.

SUMMARY OF THE INVENTION

The purpose of the present invention is to safeguard access to and operation of EDP systems as simply as possible and to safeguard against unauthorized copying or alteration of data or programs.

Basically, the present invention solves this problem in that it is an insertable element for EDP-equipment which has a processor with a built-in memory and an interface designed in such a way that it is possible to exchange data between the element's processor and the EDP-equipment's read/write head (diskette drive, magnetic-strip read/write unit or similar).

An advantage of the present invention is that it is possible to carry out operations with the element's processor, such as encryption and decryption of data or verification of user identity, while at the same time not requiring a special interface or plug-in board which may be suitable only for a particular computer system.

The element according to an embodiment of the present invention is equipped with a battery, power source, and a driver which converts signals coming from the on-board processor into the required magnetic form at an interface and converts signals coming from the EDP-equipment through the interface into the required form for the on-board processor accordingly. A further feature of the element according to an embodiment of the invention is the ability to be able to store additional data and/or programs in memory which is connected with the on-board processor. As described below, this considerably increases the areas of application for the invented element. At the same time the battery also supplies power to the other electronic components within the element. In the case of a diskette or cassette, the necessary power can be provided by an electric-generator the rotor of which is turned by the drive-shaft of the diskette-drive or by the tape-spools. The induced electric-current is controlled by a regulator in such a way that a battery could be dispensed with. However, memories which require a constant flow of electric-current need to be equipped with a battery. The electric-current supplied by the generator could also be used to recharge or back-up the battery's own power.

The use of terms such as Diskette, Cassette or similar should, within the frame of reference of this invention, be understood to means parts having the external appearance of a Diskette, Cassette etc. It does not means that the Diskettes or Cassettes mentioned necessarily contain magnetic-disks or tapes. The important point is that the element's interface can exchange data with the read/write heads of the relevant drive units. The actual function of data storage can be carried out by the memory adjacent to the on-board processor on the element.

Naturally, it would be possible to include a magnetic-disk or tape in the respective devices. In this case it may be advantageous to use the processor and its storage-facility to verify user identification and authorization. During subsequent normal operation the read/write head of the EDP-equipment could read or write magnetic signals onto the magnetic-disk or tape.

As previously mentioned, the interface of the invented element is developed in such a way as to allow data to be relayed through it between the processor and the magnetic-strip read/write apparatus or the read/write head of the Diskette/Cassette unit. One way of achieving this is to fit an electromagnetic component (e.g. one or more coils) in the vicinity of the interface which is able to generate magnetic-field information equivalent to that generated by the magnetic-strip of a magnetic-strip card, the magnetic-disk of a diskette or the magnetic-tape of a cassette etc. In this way the interface is, therefore, able to simulate the magnetic-strip, the magnetic-disk or magnetic-tape. This property of the interface is such that it allows data to be transferred from the processor in the invented element to the EDP-equipment, e.g., data which enables user identification to be verified. It is also necessary for the interface to be able to receive signals coming from the EDP-equipment via the write head and to pass these on to the processor inside the invented element. Such an exchange of data makes a variety of operations possible thereby enabling the required results to be achieved, and others also. A coil or coils connected to a driver in the vicinity of the interface can perform these functions if this driver for its part, is able to communicate with the processor.

By the use of a diskette with a magnetic-disk and a cassette with magnetic-tape it is possible to install a read/write head inside the diskette/cassette. This enables the magnetic medium (tape or disk) to be used as an intermediate storage-facility in that data supplied by the processor is initially recorded on the medium and then read by the read/write head of the EDP-equipment. Obviously it is also possible for data to be transferred in the opposit direction, i.e., recording of data by the read/write head of the EDP-equipment on the medium and the subsequent reading of this data by the read/write head in the diskette or cassette.

According to a further feature of the invention, the interface of the element, which interface is designed to allow the transfer of data between the element's processor and the EDP-equipment through the EDP-equipment's own read/write facilities, is an optical interface. The interface of a diskette according to the invention preferably is designed in a manner that it simulates an optical readable/writable disc. Details, areas of application and the advantages of this invention are illustrated in the diagrams with schematic examples.

BRIEF DESCRIPTION OF THE DRAWINGS

The following are shown.

DETAILED DESCRIPTION OF THE PREFERRED EMBODIMENT(S)

Figure 1:
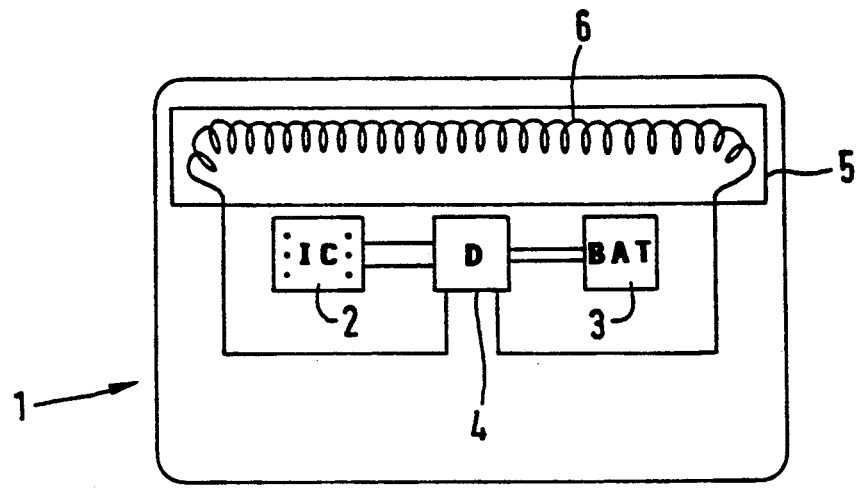
FIG. 1 is a smartcard according to an embodiment of the invention (Magnetic-Interface-Chip-Card (MICK))

The smart card according to an embodiment of the invention shown in FIG. 1 includes chip 2(IC), e.g., processor with integrated memory, the battery 3(BAT), and the driver 4(D or DRIVER). In section 5 in which the magnetic-strip is usually located in a conventional smart-card there is an interface 6 through which data can be transmitted between the processor 2 and a magnetic-strip read/write device. In the diagrams a coil symbolises one or more components which are able to generate and receive magnetic-field data.

One of the advantages of a card designed and produced in this way is that stored data (e.g. the validity of the card) can not only be verified but also altered by authorized parties. If any of the information has to be changed it is no longer necessary to replace the card. If the card is equipped with a numerical display and a key pad (not illustrated) the a PIN (Personal Identification Number/Password) can be entered into the card itself and not on the keyboard of the machine—this makes it much more difficult to ascertain the PIN by illegal means. Basically, any type of communication is possible between the processor of the smart card and the appropriate EDP-equipment. For these types of operations it is necessary for the smart card to have some sort of display, e.g., an LCD.

Figure 2:
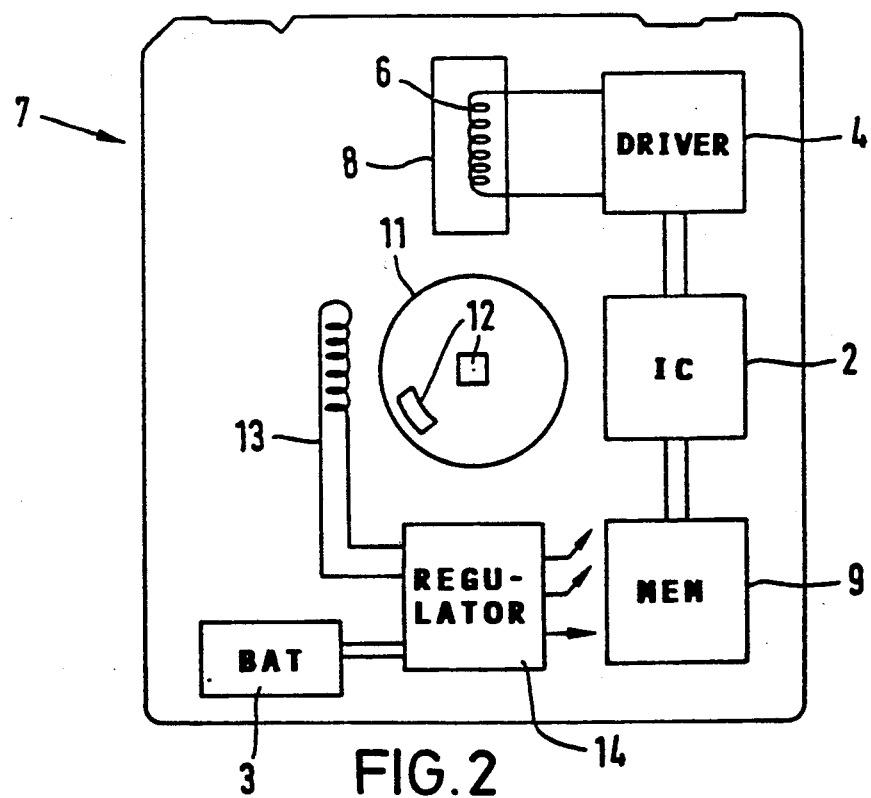
FIGS. 2 and 3 show a respective embodiment of a diskette according to the invention with and without a magnetic-disk (SMART-Diskette)

FIG. 2 shows a diskette 7 according to the invention without a magnetic-disk. In the area (aperture 8) facing the read/write head of the relevant diskette drive, interface 6 is located and is connected to driver 4(D). The latter is connected to the processor 2 which may itself be connected to additional memory 9(MEM).

Again, a battery 3(BAT) provides the individual components with electrical power. In addition there is also an electric generator consisting of rotor 11—attached to drive-unit 12 of the magnetic-disk (not illustrated), stator 13 and regulator 14(R or REGULATOR). This regulator 14 controls the generated electric current and/or keeps battery 3 sufficiently charged. Interface 6 at aperture 8 enables communication to take place between processor 2 and a central computer via its diskette drive. The advantages of this will be elaborated upon later.

Figure 3:
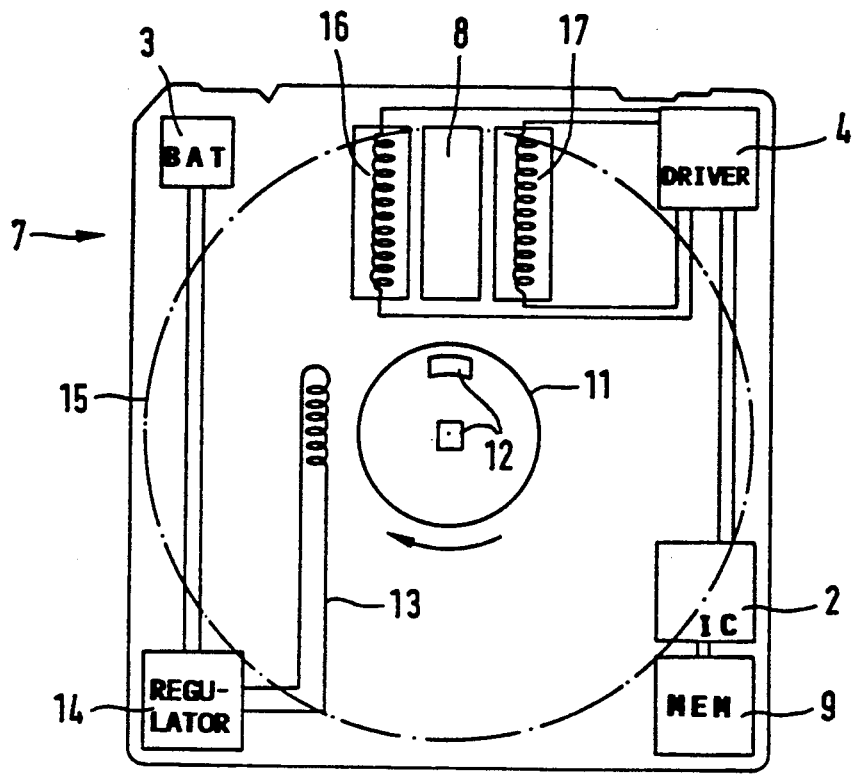

The diskette 7 shown in FIG. 3 differs from its counterpart in FIG. 2 in that it includes a magnetic-disk 15 and has read/write heads 16 & 17 of known design instead of the magnetic-interface 6 of FIG. 2. It is necessary for read head 17 and write head 16 to be located as shown in FIG. 3 sideways next to aperture 8. In this model, data is transferred from processor 2 to the central-unit of a related computer, for example, in such a way that head 16 writes this data onto magnetic-disk 15 using it as an intermediate memory which is then read by the read/write head of the computer's diskette-drive.

Figure 4:
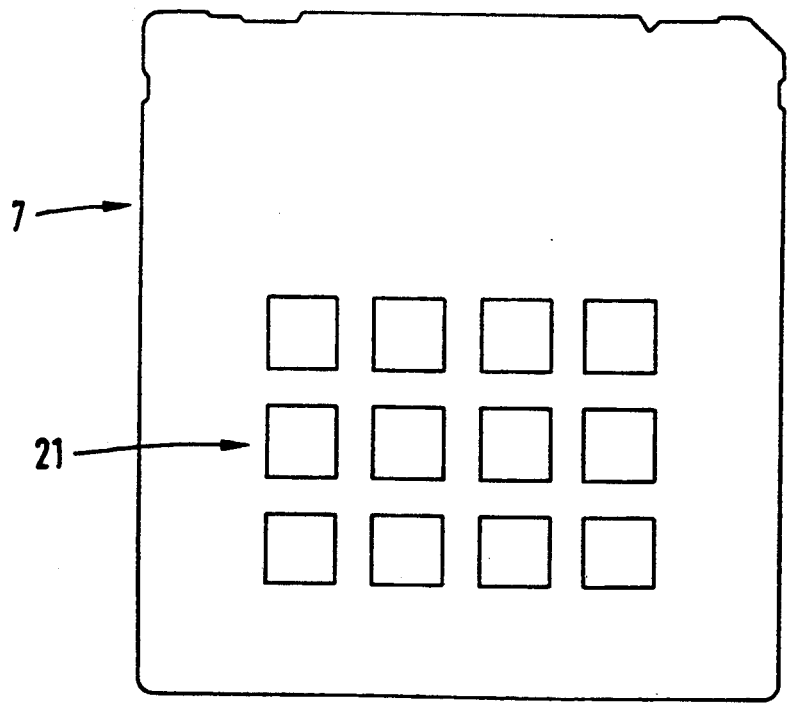
FIGS. 4–6 illustrate different types of SMART-Diskettes (PIN-SMART and SUPER-SMART-Diskette) according to the invention.
Figure 5:
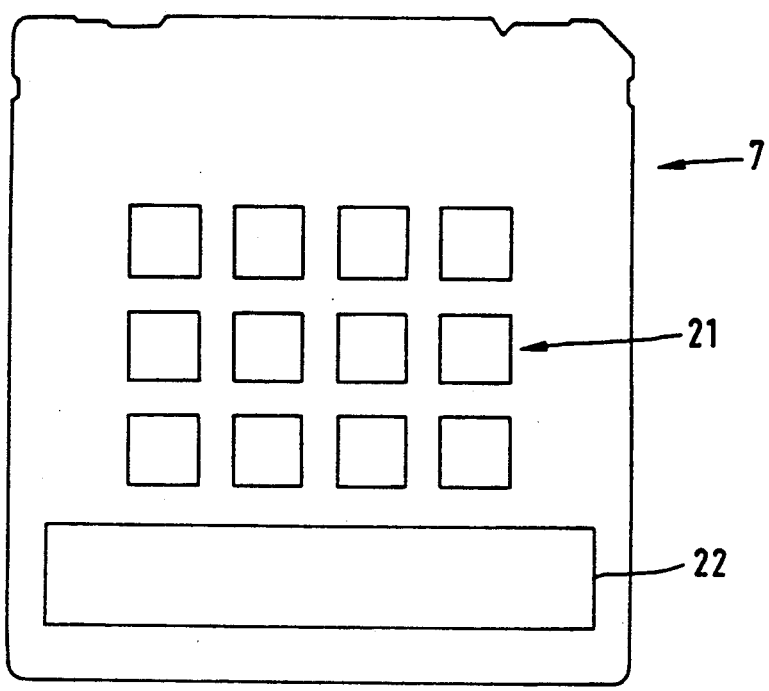
Figure 6:
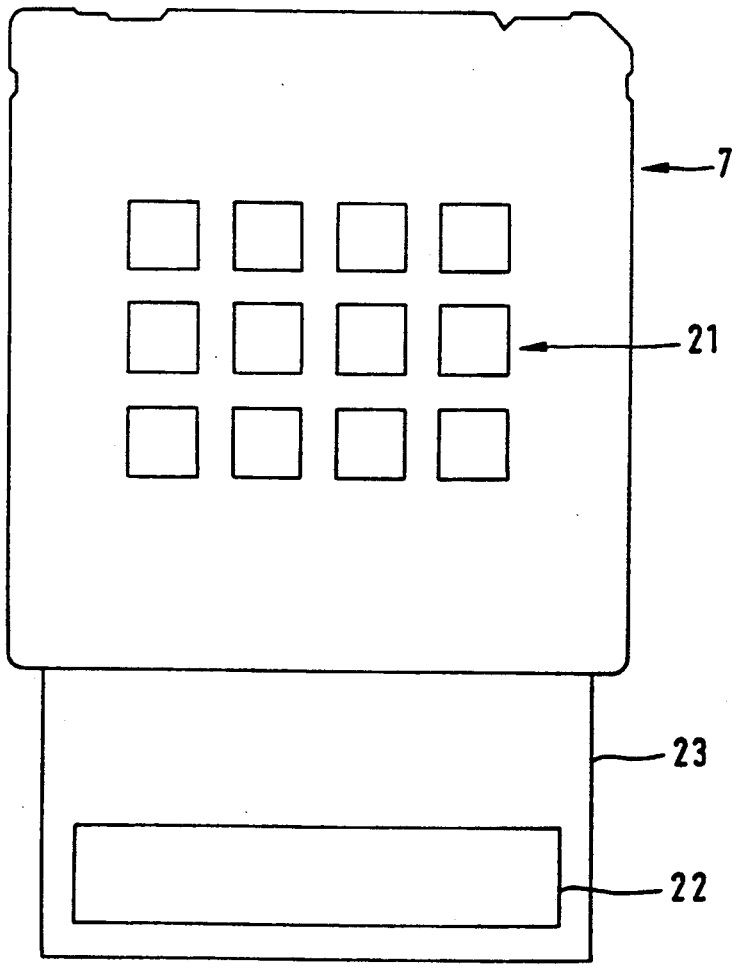

FIGS. 4–6 show the external appearance of diskette 7, e.g., with numerical display, i.e., key pad 21 and/or display 22. The model shown in FIG. 6 has keypad 21 and/or display 22 in the form of a seperate module 23 attached physically and electrically to diskette 7 so that it is visible even when the diskette is inside the computer terminal. The card illustrated in FIG. 1 and cassettes shown in FIGS. 7 & 8 can be equipped with a key pad 21 and/or display 22, 23 of this type as required.

Figure 7:
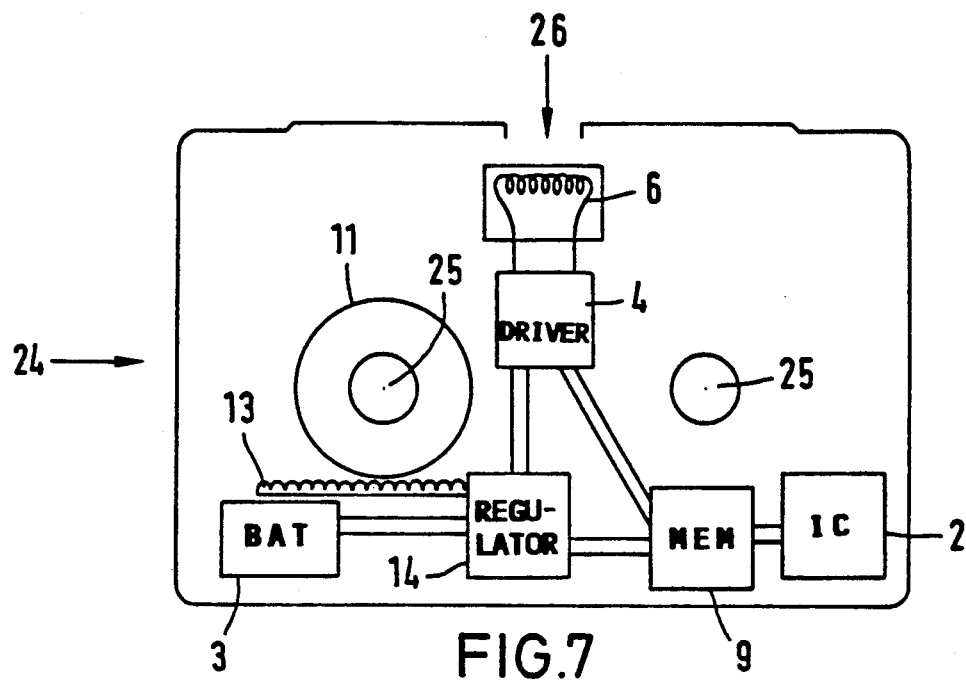
FIGS. 7 and 8 show a respective embodiment of a cassette according to the invention (SMART-Cassette).
Figure 8:
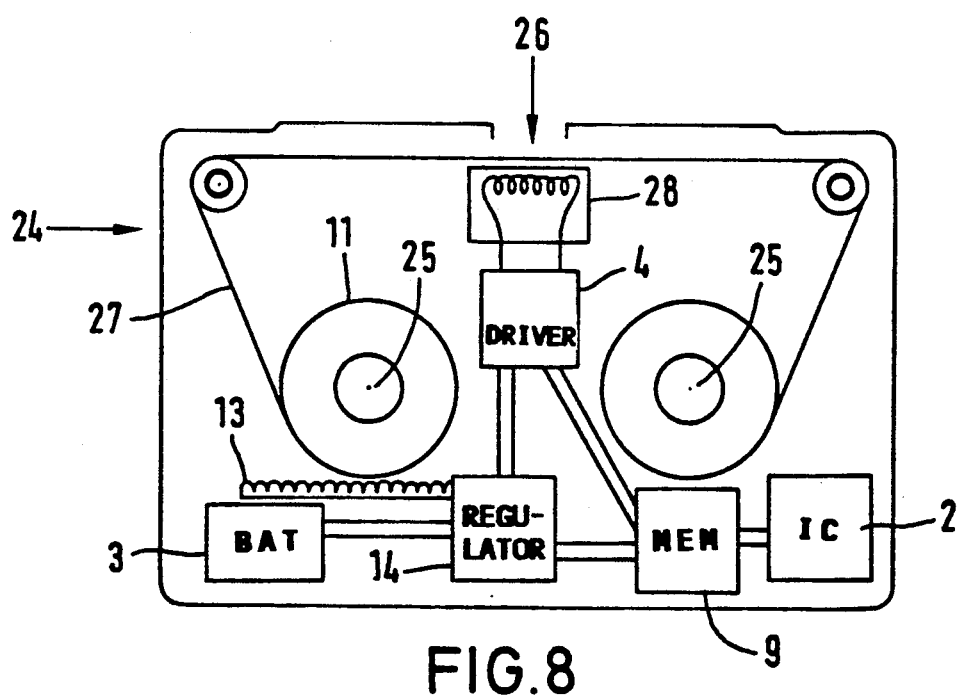

The cassettes illustrated in FIGS. 7 & 8 show—as do the diskettes in FIGS. 2 & 3—processor 2, battery 3, driver 4, additional memory 9, power generator 11, 13 and regulator 14. Rotor 11 is connected to drive-system 25 for magnetic-tape 27.

The model shown in FIG. 7 does not have a magnetic-tape 27. In the area marked 26 facing the read/write head of the cassette-terminal, interface 6 is located. This is able to simulate magnetic-tape 27 and enables data to be exchanged between processor 2 and the central-unit of the relevant computer.

The model illustrated in FIG. 8 does include a magnetic-tape 27. Facing this tape 27 is a read/write head 28 of usual design. As described in the case of the diskette 7 in FIG. 3, the data storage (in this case the tape-27) is used as an intermediate storage facility for data transmission between processor 2 and the computer.

A particular advantage of the described diskettes and cassettes is that they have a processor with which procedures such as verification of user authorization, encryption and decryption of data and protection of copyright can be carried out.

To verify user-authorization a PIN-code is necessary which is entered either on the keyboard of the EDP-equipment and communicated through the relevant interface (6, 8, 26) into processor 2 or, if the element itself is equipped with a key pad, entered into its key pad. At this point, the PIN is verified, the result of which procedure is passed back to the EDP-equipment via the interface. The alteration of the PIN-code or similar information kept in processor 2 or its memory 9 is also possible (assuming the necessary authorization) using a similar procedure.

It is also possible to use the invented device to check whether the user is working on the correct computer. Accordingly the central computer asks the user for an additional secret code after the PIN has been verified which is also verified by processor 2. The result of this procedure can be shown on display 22. Of advantage here is the display shown in FIG. 6 which allows the result to be read without removing the element from the terminal-socket.

It is of particular advantage also to be able to use processor 2 in the various elements to encrypt and decrypt data by transmitting plaintext data to processor 2 through the interface and back in encrypted form through this interface. For example, message authentication codes and digital signatures based on RSA-algorthm can be generated and verified as well as digital envelopes can be sealed and opened.

In order to use any of the elements as an encryption/-decryption machine, it is necessary to load the element's memory units with one or more cryptographic algorithms, secret codes etc. in such a way that they cannot be reproduced.

To prevent unauthorized copying of programs or sections thereof, it is possible to store parts of these or the whole programs in the elements' processors. A program is particularly safe from unauthorized reproduction if one section is stored in the EDP-equipments' computer and the rest in processor 2 of any of the invented elements.

I claim:

1. An insertable device, for use with electronic data processing equipment having a data transfer unit including read/write heads and one of a diskette-drive and a tape cassette removable media storage unit, for receiving a removable traveling storage media, the device comprising:
    housing means for insertion into the electronic data processing equipment removable media storage unit, the housing means being one of a diskette and a cassette housing of a shape and size designed to fit and operatively engage the data transfer unit;
    interface means disposed in said housing means, for allowing the transfer of data between the device and the read/write heads of the data transfer unit;
    processor means disposed in said housing means and operatively connected to said interface means, for performing processing of data; and
    electric power generator means, operatively coupled to said interface means and said processor means, disposed in said housing means, for generating electrical power for said device, and including a rotor having means for engaging a media moving mechanism of a data transfer unit of the electronic data processing equipment when said device is inserted in the data transfer unit, a stator, and a power regulator connected to said stator.

2. The device according to claim 1, further comprising:
    a battery, disposed in said housing means, for storing energy to operate the device; and
    wherein the interface means includes simulation means for simulating a traveling storage medium, the simulation means comprising driver circuit means operatively connected to the processor means, for converting digital data signals from the processor means into simulated traveling storage media signals to be provided to the data transfer unit of the electronic data processing equipment and for converting received signals from the electronic data processing equipment data transfer unit into digital data signals for processing by the processor means.

3. The device according to claim 2, wherein said interface means includes at least one magnetic coil, and wherein said interface means simulates one of a magnetic diskette and a magnetic tape by producing magnetics signals with said coil.

4. The device according to claim 1, further comprising:
    memory means for storing at least one of data and programs disposed in said housing means and operatively connected to the processor means.

5. The device according to claim 1, further comprising a battery disposed in said housing means and wherein:
    said generator means is connected for recharging the battery, and the battery provides the device with power.

6. The device according to claim 1, wherein the interface means comprises:
    electrical coupling means for providing signals to the storage unit in the same form as signals read from one of a diskette and a cassette.

7. The device according to claim 1, further comprising:
    a key-pad for inputting data into the device having at least numerical and function keys, said key-pad operatively connected to said processor means.

8. The device according to claim 1, further comprising:
    display means operatively connected to said processor means, for displaying data to a user of the device.

9. The device according to claim 1, further comprising:
    a key-pad for inputting data into the device having at least numerical and function keys, said key-pad operatively connected to said processor means; and
    display means operatively connected to said processor means, for displaying data to a user of the device;
    wherein said key-pad and said display means are configured as a modular unit attached physically and electrically to the device.

10. The device according to claim 1, wherein the interface means includes simulation means for simulating a traveling storage medium by providing signals which change with time.

11. The device according to claim 1, wherein said interface means includes means for simulating an optical disc.

12. An insertable device, for use with electronic data processing equipment having a data transfer unit including read/write heads and one of a diskette-drive and a tape cassette removable media storage unit, for receiving a removable traveling storage media, the device comprising:
    housing means for insertion into the electronic data processing equipment removable media storage unit, the housing means being one of a diskette and a cassette housing of a shape and size designed to fit and operatively engage the data transfer unit;
    interface means disposed in said housing means, for allowing the transfer of data between the device and the read/write heads of the data transfer unit; and processor means disposed in said housing means and operatively connected to said interface means, for performing processing of data;

wherein the interface means comprises magnetic media including one of a magnetic-disk and a magnetic-tape; and magnetic read/write head means for reading and/or writing data from and to the magnetic media, said head means being operatively connected via a driver circuit to the processor means.

13. An insertable device, for use with electronic data processing equipment having a data transfer unit including read/write heads and one of a diskette-drive and a tape cassette removable media storage unit, for receiving a removable traveling storage media, the device comprising:

housing means for insertion into the electronic data processing equipment removable media storage unit, the housing means being one of a diskette and a cassette housing of a shape and size designed to fit and operatively engage the data transfer unit;

interface means disposed in said housing means, for allowing the transfer of data between the device and the read/write heads of the data transfer unit; and processor means disposed in said housing means and operatively connected to said interface means, for performing processing of data;

wherein the housing means is a diskette housing for insertion into a diskette drive storage unit; the housing means includes a read/write aperture; and said interface means comprises:

a magnetic disk rotatably mounted in said housing means;

a write head for writing data onto the magnetic disk; and a read head for reading data from the magnetic disk;

with the read head and the write head being operatively connected to the processor means and being fixedly mounted in said housing means on opposite sides of the aperture in said housing means in a direction of movement of the magnetic disk, the aperture facing the read/write head(s) of the diskette drive data transfer unit into which the device is inserted.

* * * * *